(12) United States Patent
Pechersky

(10) Patent No.: US 9,634,935 B2
(45) Date of Patent: Apr. 25, 2017

(54) METHOD, NAME SERVER, AND SYSTEM FOR DIRECTING NETWORK TRAFFIC UTILIZING PROFILE RECORDS

(71) Applicant: Secured Connectivity, LLC, Winter Park, FL (US)

(72) Inventor: Leonid Pechersky, Thornhill (CA)

(73) Assignee: Secured Connectivity, LLC, Winter Park, FL (US)

( * ) Notice: Subject to any disclaimer, the term of this patent is extended or adjusted under 35 U.S.C. 154(b) by 616 days.

(21) Appl. No.: 13/869,562

(22) Filed: Apr. 24, 2013

(65) Prior Publication Data

US 2014/0325045 A1   Oct. 30, 2014

(51) Int. Cl.
*G06F 15/16* (2006.01)
*H04L 12/741* (2013.01)
(Continued)

(52) U.S. Cl.
CPC ........ *H04L 45/745* (2013.01); *H04L 63/0407* (2013.01); *H04L 61/1511* (2013.01)

(58) Field of Classification Search
None
See application file for complete search history.

(56) References Cited

U.S. PATENT DOCUMENTS 6,182,141 B1   1/2001 Blum et al.
7,274,783 B2 *  9/2007 Yoakum ............ H04L 29/06027
                                                          379/219

(Continued)

FOREIGN PATENT DOCUMENTS

CA   2291393 A1   6/2000
CA   2788573 A1   11/2012
(Continued)

OTHER PUBLICATIONS

Serverlron ADX Global Server Load Balancing Guide, downloaded from http://www.brocade.com/support/Product_Manuals/Serverlron_ADXGlobalServer_Load . . . Oct. 25, 2012.
(Continued)

*Primary Examiner* — Thomas Dailey
(74) *Attorney, Agent, or Firm* — Knobbe, Martens, Olson & Bear, LLP

(57) ABSTRACT

A server, intermediation server, system and a method for directing network traffic are provided. The name server and intermediation server each include a network interface configured to communicate with a network, a memory configured to store the profile record a processor in communication with the memory and the network interface. The name server is for returning an assigned query result to a originating computing device when a destination identifier is associated with the profile record. The intermediation server is for perform a routing operation based on the request. The system includes an originating computing device a name server and an intermediation server all connected to a network. The method involves receiving a profile record and destination identifier, determining an association of the between the profile record and identifier, and returning with an assigned query result or a default query result.

19 Claims, 11 Drawing Sheets

(51) Int. Cl.
*H04L 29/06* (2006.01)
*H04L 29/12* (2006.01)

(56) References Cited

U.S. PATENT DOCUMENTS

| | | |
|---|---|---|
| 7,962,569 B2 | 6/2011 | Sewall et al. |
| 8,191,132 B1 | 5/2012 | Boscolo et al. |
| 2001/0034709 A1 | 10/2001 | Stoifo et al. |
| 2002/0120782 A1 | 8/2002 | Dillon et al. |
| 2004/0098485 A1 | 5/2004 | Larson et al. |
| 2004/0143738 A1 | 7/2004 | Savage et al. |
| 2004/0215707 A1* | 10/2004 | Fujita ............... H04L 29/06 709/201 |
| 2005/0033659 A1 | 2/2005 | Zucker et al. |
| 2006/0023646 A1 | 2/2006 | George et al. |
| 2009/0047937 A1* | 2/2009 | Zellner ............ H04L 63/0281 455/414.1 |
| 2009/0171982 A1 | 7/2009 | Hagan et al. |
| 2009/0228708 A1 | 9/2009 | Trostle |
| 2009/0313318 A1* | 12/2009 | Dye ................. G06Q 30/00 709/202 |
| 2010/0217825 A1* | 8/2010 | Gopalakrishna ........ H04L 67/02 709/217 |
| 2011/0110568 A1 | 5/2011 | Vesper et al. |
| 2011/0283017 A1 | 11/2011 | Alkhatib et al. |
| 2012/0191874 A1* | 7/2012 | Robinson ........... H04L 29/12066 709/245 |
| 2012/0278621 A1* | 11/2012 | Woloszyn .......... H04L 61/2596 713/168 |

FOREIGN PATENT DOCUMENTS

| | | |
|---|---|---|
| EP | 1011244 A2 | 6/2000 |
| WO | 9938303 | 7/1999 |
| WO | 0014938 | 3/2000 |
| WO | 01/92997 A2 | 12/2001 |

OTHER PUBLICATIONS

PCT International Application No. PCT/CA2013/000403 International Search Report dated Nov. 12, 2013.
PCT International Application No. PCT/CA2013/000403 Written Opinion of the International Searching Authority dated Nov. 13, 2013.

* cited by examiner

METHOD, NAME SERVER, AND SYSTEM FOR DIRECTING NETWORK TRAFFIC UTILIZING PROFILE RECORDS

FIELD

The present specification relates generally to network traffic, and more particularly to a directing network traffic.

BACKGROUND

In an increasingly wired, interactive world, a great many people have become concerned about the privacy issues that arise when casual Internet searches have a market value assigned to them, primarily from though not limited to marketers and advertisers looking to assemble a profile on the habits and preferences of individual browsers.

The concern for many is that marketers are packaging insights gleaned from the tracking of IP addresses in order to assemble profiles on individuals who are wary of being tracked. In the blogosphere, writers who wish to provide anonymous political commentary may feel threatened and inhibited in an environment where their identity can be guessed at and, even theoretically, where an inventory of their personal preferences and intellectual interests can be compiled for use in government or corporate databases.

To address just some of these concerns, an industry has arisen to provide a semblance of anonymity for those concerned with maintaining their existing rights to privacy while online. The consumer market that looks to this industry for privacy protection is one that values the right to anonymous free expression, even when such expression is expressed in social forums. Bloggers who wish to express political dissent, or to raise controversial ideas, in a public context may wish to be known by a pseudonym or online tag rather than by their true identity. To provide an added layer of online anonymity, they would require the use of a service that masks their true Internet Protocol (IP) address, which not only operates to shield their true identity, but can also be used to mask their true location. This is a valuable factor for those looking to frustrate the efforts of those interested in packaging (often for commercial and data-mining purposes) a comprehensive profile of online commentators, buyers, and casual browsers.

The market demand for online privacy has grown tremendously over the years, offering comprehensive anonymity solutions for those who do not want their search preferences, content streaming decisions, online social interactions, and uploading activities to be compiled by reference to an IP address that can be matched with their identity and other demographic details.

As an example, Virtual Private Networks can be used to mask one's IP address across the full expanse of one's online search activities, offering IP address anonymity in places where identification of the originating IP address is not required. However, in some situations, the IP address cannot be anonymous for various reasons such as security. For instance, a pseudonymous blogger, who does not wish their content-streaming and downloading choices to be tracked and compiled with their IP address, may nevertheless require their IP address to be unmasked when engaging in important online activities that are necessarily linked to their true identity such as online banking. An attempt to access an online account through a masked IP address can raise a red flag with the banking institution. A masked IP address, pointing to a location other than the one normally identified with a known area of residence may prompt the bank to automatically block access to the account on suspicion that an attempt at fraud is being perpetrated from a remote location. In such circumstances, masking of an IP address for one desired online activity will frustrate another desired online activity.

For example, the overall masking of their IP address can be disabled, thereby rendering the originating IP address identifiable, enabling online access to their bank account. However, one must be mindful to once again "switch on" the functionality for those online activities for which they desire anonymity. In practice, the user must constantly keep track in their head as to their status, continually being mindful as to whether they've taken care to "switch on" or "switch off" their masking functionality in accordance with their particular online needs, for each and every site they visit.

In addition, masking can slow down the downloading time for certain sites that detect IP addresses for the purposes of optimally select a source for delivering content sourced from more than one location. In short, masking can frustrate the optimal use of content delivery networks. For instance, where a Canadian client is proxied on an American server, the effect is that a content provider might deliver content from the more remote American location, even though the more optimal solution could have been for the content provider to deliver content from the Canadian location. As a result, the masking functionality provides for a slower downloading experience.

Furthermore, the typical consumer of masking services often does not require, or desire, masking every site they might browse. Again, unless the consumer is mindful to turn off the functionality for those sites where they do not desire to mask their IP address, the consumer will be faced with slower loading time for such web pages, as they are unnecessarily proxied through an outside server rather than directly through their internet service provider. In turn, such consumers place a greater comparative "load" on the proxy servers used by their service. In effect, this unnecessary excess use of masking services by a critical mass of consumers can cause the servers providing the masking functionality to significantly slow the loading of pages for everyone using the service. Accordingly, the service would have to sustain significantly more costs in ensuring sufficient server capacity leading to increased server costs.

On the other hand, those consumers who are mindful enough to switch off the functionality may very well have their page loading speed restored to its optimal level, yet they may continue to suffer significantly slower page loadings when restoring the functionality for those sites where such functionality is desired. Under such circumstances, the service's servers may be chronically overloaded due to the browsing habits of the less technically savvy portion of the customer base, who may be unknowingly, and unnecessarily, employing the masking services across the full expanse of their web browsing activities, negatively affecting the optimal use of the functionality for all.

SUMMARY

In accordance with an aspect of the specification, there is provided a name server for directing network traffic from an originating computing device to a destination computing device. The name server includes a network interface. The network interface is configured to communicate with a network to receive a profile record for the originating computing device and to receive a destination identifier. The name server also includes a memory configured to store the profile record. Furthermore, the name server includes a processor in communication with the memory and the network interface. The processor is configured to determine if the destination identifier is associated with the profile record. The processor is also configured to return, via the network interface, an assigned query result to the originating computing device when the destination identifier is associated with the profile record. In addition, the processor is configured to return, via the network interface, a default query result to the originating computing device when the destination identifier is not associated with the profile record.

The processor may be further configured to request the assigned query result from an intermediation server.

The destination identifier may be a request for an intended numerical address.

The processor may be further configured to identify the originating computing device.

In accordance with another aspect of the specification, there is provided an intermediation server for directing network traffic from an originating computing device to a destination computing device. The intermediation server includes a network interface configured to communicate with a network to receive a request for data intended for the destination computing device and a source identifier associated with the originating computing device. In addition, the intermediation server includes a memory configured to store routing information in a routing database. Furthermore, the intermediation server includes a processor in communication with the memory and the network interface. The processor is configured to perform a routing operation based on the request, the source identifier and the routing information.

The processor may be further configured to determine a routing operation based on the originating computing device and the destination identifier.

The routing operation may involve blocking traffic between the originating computing device and the destination computing device.

The routing operation may involve providing a notification interrupt for inserting a notification page.

The routing operation may involve anonymizing the originating computing device.

In accordance with another aspect of the specification, there is provided a system. The system includes an originating computing device connected to a network. The system further includes a name server for directing network traffic from the originating computing device to a destination computing device. The name server includes a first network interface configured to communicate with the network to receive a profile record for the originating computing device and a destination identifier. The name server also includes a first memory configured to store the profile record. In addition, the name server includes a processor in communication with the first memory and the first network interface. The processor is configured to determine if the destination identifier is associated with the profile record. The processor is configured to return, via the first network interface, an assigned query result to the originating computing device when the destination identifier is associated with the profile record. Also, the processor configured to return, via the network interface, a default query result to the originating computing device when the destination identifier is not associated with the profile record. The system also includes an intermediation server for directing network traffic from the originating computing device to the destination computing device. The intermediation server includes a second network interface configured to communicate with the network to receive a request for data intended for the destination computing device and a source identifier associated with the originating computing device. The intermediation server also includes a second memory configured to store routing information in a routing database. Furthermore, the intermediation server includes a processor in communication with the second memory and the second network interface. The processor is configured to perform a routing operation based on the request, the source identifier and the routing information.

In accordance with another aspect of the specification, there is provided a method of directing network traffic. The method involves receiving, at a name server, a profile record for an originating computing device. The method further involves receiving, at the name server, a destination identifier from the originating computing device. The destination identifier associated with a destination computing device. In addition, the method involves determining, at the name server, if the destination identifier is associated with the profile record. The method involves returning, from the name server, an assigned query result to the originating computing device when the destination identifier is associated with the profile record. Furthermore, the method involves returning, from the name server, a default query result to the originating computing device when the destination identifier is not associated with the profile record.

The name server may request the assigned query result from an intermediation server.

The destination identifier may be a request for an intended numerical address.

The method may further involve identifying, at the intermediation server, the originating computing device.

The method may further involve determining, at the intermediation server, a routing operation based on the originating computing device.

The method may further involve routing traffic in accordance with the routing operation.

The routing operation may involve blocking traffic between the originating computing device and the destination computing device.

The routing operation may involve providing, from the intermediation server to the originating computing device, a notification interrupt for inserting a notification page.

The routing operation may involve anonymizing the originating computing device.

In accordance with another aspect of the specification, there is provided a non-transitory computer readable medium encoded with codes. The codes are for directing a processor to receive a profile record for an originating computing device. The codes are for further directing a processor to receive a destination identifier from the originating computing device. The destination identifier is associated with a destination computing device. In addition, the codes are for directing a processor to determine if the destination identifier is associated with the profile record. Furthermore, the codes are for directing a processor to return an assigned query result to the originating computing device when the destination identifier is associated with the profile record. The codes are also for directing a processor to return a default query result to the originating computing device when the destination identifier is not associated with the profile record.

BRIEF DESCRIPTION OF THE DRAWINGS

Reference will now be made, by way of example, to the accompanying drawings in which.

DETAILED DESCRIPTION OF THE EMBODIMENTS

Figure 1:
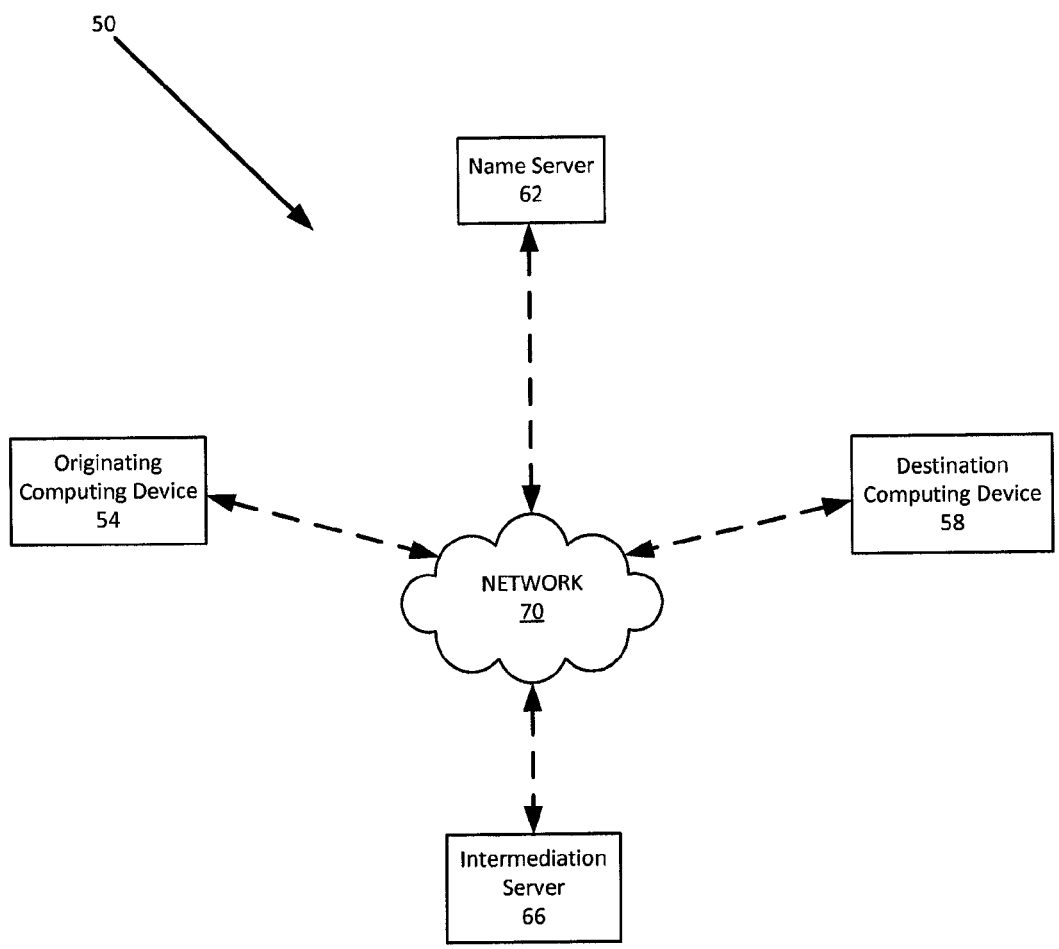
FIG. 1 is a schematic representation of a system for directing network traffic in accordance with an embodiment.

Referring to FIG. 1, a system for directing network traffic is generally shown at 50. It is to be understood that the system 50 is purely exemplary and with the benefit of this description, it will become apparent to those skilled in the art that variations on system 50 are contemplated. The system 50 includes an originating computing device 54, a destination computing device 58, a name server 62, and an intermediation server 66 interconnected by a network 70.

In a general sense, the originating computing device 54 can be any type of computing device configured to communicate over the network 70 for sending and receiving data. In general, the originating computing device 54 includes programming instructions in the form of codes stored on a computer readable medium. The programming instructions can direct a processor to perform the functions described in greater detail below. The originating computing device 54 is not particularly limited and can include any one of a personal computer, a laptop computer, a portable electronic device, a gaming device, a mobile computing device, a portable computing device, a tablet computing device, a personal digital assistant, a cell phone, a smart phone, a printer, a scanner, a router or the like. It is to be emphasized that these particular computing devices are merely exemplary and that a vast array of other types of computing devices capable of functioning as the originating computing device 54 are within the scope of the invention.

Similar to the originating computing device 54, the destination computing device 58 can be any type of computing device configured to communicate over the network 70 for sending and receiving data. It is to be appreciated that, in general, the destination computing device 58 also includes programming instructions in the form of codes stored on a computer readable medium. The destination computing device 58 is not particularly limited and can be any one of the types of computing devices discussed above in connection with the originating computing device 54.

In an illustrative, present embodiment, the originating computing device 54 is configured to request content from the destination computing device 58 using a destination identifier, such as a domain name. For example, the originating computing device 54 can be a client device executing a browser, such as a smartphone or a desktop computing device, while the destination computing device 58 can be a web server, wherein the originating computing device 54 is configured to interact with a website hosted on the destination computing device 58. The originating computing device 54 is thus configured to send and receive data over the network 70 related to interactions associated with web traffic.

The name server 62 can be any type of server configured to provide a response to a query received over the network 70. In the present embodiment, the query includes a destination identifier associated with the destination computing device 58 and a source identifier associated with the originating computing device 54. The configuration of the computing environment of the name server 62 is not particularly limited and can be high performance commercially available server systems. Alternatively, the name server 62 can be a desktop personal computer or any one of the devices mentioned above in connection with the originating computing device 54. It is to be appreciated that less powerful computing devices can be used to reduce costs for systems not requiring a server with large processing power, such as a system having to a relatively small amount of network traffic. In other embodiments, the name server 62 can be implemented as one or more virtual servers, or a rented server session in the cloud accessed through the network 70. In the present embodiment, the name server 62 is configured to receive a query in the form of a destination identifier, such as a domain name, and return a query result such as a numerical address or an alias. For example, a numerical address can be an Internet Protocol (IP) address associated with the destination identifier. Therefore, in this example, the destination identifier can be a request for an intended numerical address associated with the destination computing device 58. The alias can be a query result that is another destination identifier used for a subsequent query at the name server 62. For example, if the destination identifier is a domain name (eg. "google.com"), the query result can be another domain name (eg. "google.ca") to which the query redirects. It is to be appreciated that the destination identifier is not limited to a domain name and that other types of destination identifiers can be used such as a keyword or string of keywords. Similarly, the query result is not limited to the examples presented above and other aliases or numerical addressed can be provided.

The intermediation server 66 can be any type of server configured to function as an intermediary between the originating computing device 54 and the destination computing device 58. Similar to the name server 62, the intermediation server 66 is not particularly limited and can include high performance commercially available server systems, less powerful computing devices or virtual servers accessed through the network 70. In the present embodiment, the intermediation server 66 is configured to route network traffic from the originating computing device 54 as discussed in greater detail below.

In general terms, the system 50 is generally configured to direct network traffic from the originating computing device 54 over the network 70. It is to be re-emphasized that the system shown in FIG. 1 is a non-limiting representation only. Notwithstanding the specific example, it is to be understood that other equivalent systems can be devised to perform the same function as the system 50. For example, although the present embodiment depicts the intermediation server 66 as being separate from the name server 62, the system 50 can be modified such that the name server 62 and the intermediation server 66 operate from the same computing device for sharing resources. As another example, although the present embodiment depicts the network 70 as a single network, other embodiments can include a one or more private networks and/or one or more public networks, where each network can be behind a firewall. In another embodiment, the intermediation server 66 can be further modified to be part of either the originating computing device 54 or the destination computing device 58. Therefore, the originating computing device 54 or the destination computing device 58 can be modified to be a single unit running processes of the intermediation server 66 described in greater detail herein.

As another example of a variation of system 50, the data sent and received by the originating computing device is not limited to data related to interactions associated with web traffic. For example, the data can be other types of data can represent email, text messages, chat, file transfer, streaming media, print jobs, and any other type of data typically sent over a network linking two computing devices.

In another variation, the system 50 can be modified such that the originating computing device 54 and the destination computing device 58 are identical and operating under a peer-to-peer relationship instead of a client/server relationship. Alternatively, the originating computing device 54 and the destination computing device 58 can be interchanged such that the originating computing device 54 functions as a server and the destination computing device 58 functions as a client device.

Figure 2:
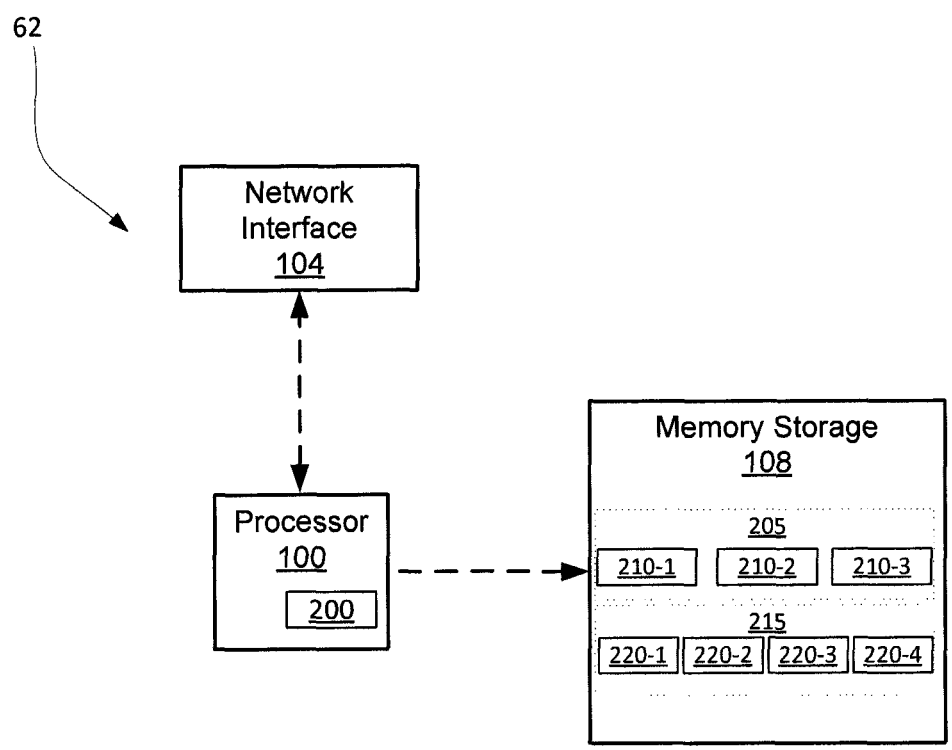
FIG. 2 is a schematic representation of a name server in accordance with the embodiment shown in FIG. 1.

Referring to FIG. 2, a schematic block diagram of the electronic components of the name server 62 is shown. It should be emphasized that the structure in FIG. 2 is purely exemplary and that several different implementations and configurations for the name server 62 are contemplated. In the present embodiment, the name server 62 is configured to provide a response to a query received over the network 70. The name server 62 includes a processor 100, a network interface 104, and a memory storage unit 108. The network interface 104 and the memory storage unit 108 are each in electrical communication with the processor 100.

The network interface 104 is not particularly limited and can include various network interface devices such as a network interface controller (NIC). In particular, the network interface 104 is generally configured to send and receive data from the network 70. For example, the network interface 104 can send data to the network 70 and receive data from the network 70 using a data link layer standard such as Ethernet, Wi-Fi, mobile network (such as, but not limited to, fourth generation (4G), third generation (3G), code division multiple access (CDMA), Groupe Spécial Mobile (GSM) or Long Term Evolution (LTE) standards), or Token Ring.

The memory storage unit 108 can be of any type such as non-volatile memory (e.g. Electrically Erasable Programmable Read Only Memory (EEPROM), Flash Memory, hard disk, floppy disk, optical disk, solid state drive, or tape drive) or volatile memory (e.g. random access memory (RAM)). Although the memory storage unit 108 is generally a type of non-volatile memory because of the robust nature of non-volatile memory, some embodiments can use volatile memory in situations where high access speed is desired. In the present embodiment, the memory storage unit 108 is a non-volatile memory unit storing a profile mapping database 205 and a default mapping database 215. The profile mapping database 205 includes a plurality of profile records 210-1, 210-2, and 210-3. In the present embodiment, each profile record 210-1, 210-2, and 210-3 includes a datafield for a source identifier associated with the originating computing device 54. In addition, each profile record 210-1, 210-2, and 210-3 includes datafields for storing the destination identifier and an assigned query result, such as an assigned numerical address associated with the intermediation server 66. The assigned numerical address can be provided by the intermediation server 66 in response to a request from the name server 62 either periodically or on an as needed basis. For example, the datafields can function to cache the numerical address for a period of time. Alternatively, the assigned numerical address can be a static address stored in the datafields for a prolonged period of time.

The default mapping database 215 includes a plurality of default records 220-1, 220-2, 220-3 and 220-4. In the present embodiment, each default record 220-1, 220-2, 220-3 and 220-4 includes datafields for storing a destination identifier and a default query result, such as a numerical address. In the present embodiment, the default mapping database 215 provides mapping data for operating a domain name system (DNS) server at the name server 62. Therefore, it is to be appreciated, with the benefit of this description that the name server 62 can operate as a typical DNS server in the absence of the profile mapping database 205.

The processor 100 is generally configured to execute programming instructions 200 for receiving queries from the originating computing device 54 via the network interface 104. For example, a query can include a request for a query result based on a destination identifier. In the present embodiment, the query received by the processor 100 includes a data message having a source identifier and a destination identifier. The programming instructions 200 further cause the processor 100 to determine whether the profile mapping database 205 includes a profile record associated with the destination identifier and the originating computing device 54 as identified by the source identifier. The programming instructions 200 further direct the processor 100 to return, to the originating computing device 54, an assigned query result or a default query result based on the determination.

In the present embodiment, the assigned query result is configured to point to the intermediation server 66. Therefore, instead of the originating computing device 54 sending data messages to the destination computing device 58, the originating computing device 54 sends data messages to the intermediation server 66. In the present embodiment, the intermediation server 66 is configured to function as an intermediary between the originating computing device 54 and the destination computing device 58. For example, the intermediation server 66 can be configured to function as a proxy between the originating computing device 54 and the destination computing device 58.

In general terms, the name server 62 is generally configured provide a query result based on the destination identifier and the source identifier. However, it is to be re-emphasized that the structure shown in FIG. 2 is a schematic, non-limiting representation. For example, although the present embodiment shown in FIG. 2 includes the memory storage unit 108 for storing a profile mapping database 205 having three profile records 210-1, 210-2, and 210-3, it is to be understood that the profile mapping database 205 can be modified to store more or less profile records. Similarly, although the present embodiment shown in FIG. 2 includes the memory storage unit 108 for storing a default mapping database 215 having four default records 220-1, 220-2, 220-3, and 220-4, it is to be understood that the default mapping database 215 can be modified to store more or less default records. In addition, the data structure of the memory storage unit 108 is not particularly limited and can be modified to include other data structures. Furthermore, it is to be appreciated that each profile record 210-1, 210-2, and 210-3 can be modified to exclude the datafield for a source identifier associated with the originating computing device 54 for embodiments having a single originating computing device or other data structures. It is to be appreciated, with the benefit of this description, that variations are contemplated. For example, in another embodiment, the profile mapping database 205 can be stored on another device dedicated to the maintenance of the profile records 210-1, 210-2, and 210-3 are delegated to the other device.

Figure 3:
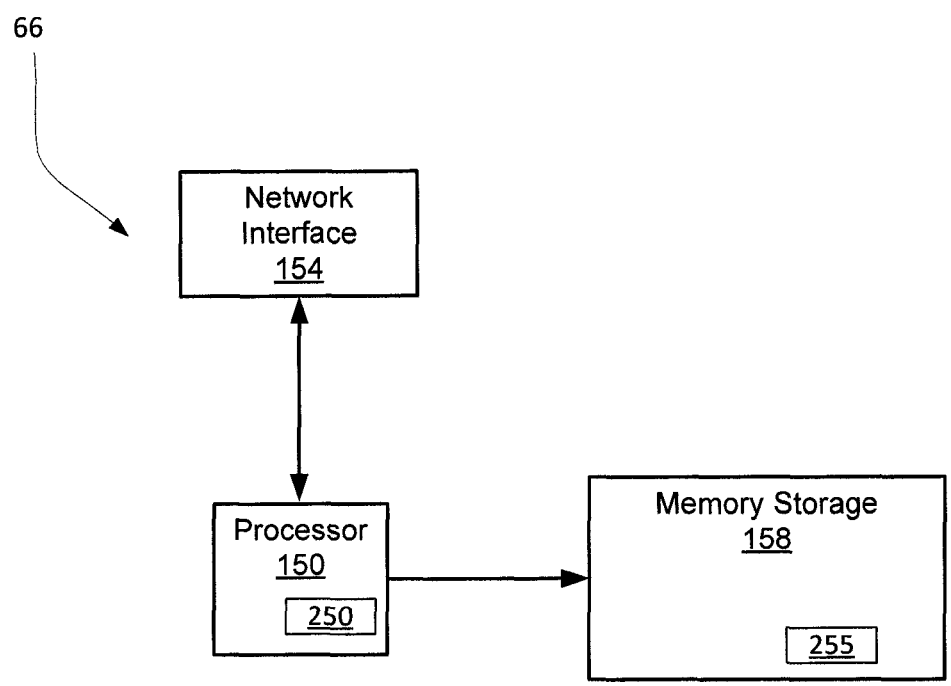
FIG. 3 is a schematic representation of an intermediation server in accordance with the embodiment shown in FIG. 1.

Referring to FIG. 3, a schematic block diagram of the electronic components of the intermediation server 66 is shown. It should be emphasized that the structure in FIG. 3 is purely exemplary and that several different implementations and configurations for the intermediation server 66 are contemplated. In the present embodiment, the intermediation server 66 is for routing network traffic from the originating computing device 54. The intermediation server 66 includes a processor 150, a network interface 154, and a memory storage unit 158. The network interface 154 and the memory storage unit 158 are each in electrical communication with the processor 150.

The network interface 154 is not particularly limited and can include various network interface devices such as a network interface controller (NIC). In particular, the network interface 154 is generally configured to send and receive data from the network 70. For example, the network interface 154 can send data to the network 70 and receive data from the network 70 using a data link layer standard such as those contemplated for the network interface 104.

Similar to the memory storage unit 108, the memory storage unit 158 can be of any type such as non-volatile memory (e.g. Electrically Erasable Programmable Read Only Memory (EEPROM), Flash Memory, hard disk, floppy disk, optical disk, solid state drive, or tape drive) or volatile memory (e.g. random access memory (RAM)). Although the memory storage unit 158 is generally a type of non-volatile memory because of the robust nature of non-volatile memory, some embodiments can use volatile memory in situations where high access speed is desired. In the present embodiment, the memory storage unit 158 is a non-volatile memory unit storing a routing database 255 having routing information for carrying out a routing operation. In the present embodiment, the routing database routes network traffic form the originating computing device to the destination computing device 58.

The routing information is not particularly limited and can include instructions for carrying out various operations. For example, the routing information can direct the processor 150 to block network traffic and return data messages to the originating computing device 54 for providing exception handling reply message, such as a notice that traffic between the originating computing device 54 and the destination computing device 58 is blocked. As another example, the routing information can direct the processor 150 to generate and insert a notification page prior to providing content requested by the originating computing device. The routing information can also direct the processor 150 to remove predetermined portions of content requested by the originating computing device 54 such as cookies or advertisements on a webpage. The routing information can direct the processor 150 to anonymize the originating computing device 54 such that the destination computing device 58 cannot determine the origin of data messages. In addition, the routing information can direct the processor 150 to log the network traffic. Furthermore, in embodiments where the intermediation server 66 is a trusted device behind a firewall, the routing information can provide access through the firewall to the originating computing device 54, when the originating computing device 54 would otherwise have been denied access. The routing information can also direct the processor 150 be used to route traffic from the originating computing device 54 to the destination computing device 58 when direct communication between the originating computing device 54 and the destination computing device 58 is prohibited, for example, by a firewall.

The processor 150 is generally configured to execute programming instructions 250 for receiving a request for data from the originating computing device 54 via the network interface 104, such as a request for a web page associated with the destination identifier. In the present embodiment, the request for data received by the processor 150 includes a source identifier. The programming instructions 250 further direct the processor 150 to determine whether the routing database 255 includes a pre-determined routing record cached in the intermediation server 66. A routing record includes routing information associated with a specific source identifier received from the originating computing device 54. For example, a routing record can include routing information for various difference requests for data from the originating computing device 54 such that different routing operations can be carried out dependent on the request for data as well as the source identifier. If a routing record exists, the programming instructions 250 direct the processor 150 to route the traffic from the originating computing device 54 in accordance with the routing information. If no routing record exists, the processor returns an error to the originating computing device.

In general terms, the intermediation server 66 is generally configured for routing network traffic from the originating computing device 54. However, it is to be re-emphasized that the structure shown in FIG. 3 is a schematic, non-limiting representation.

Figure 4:
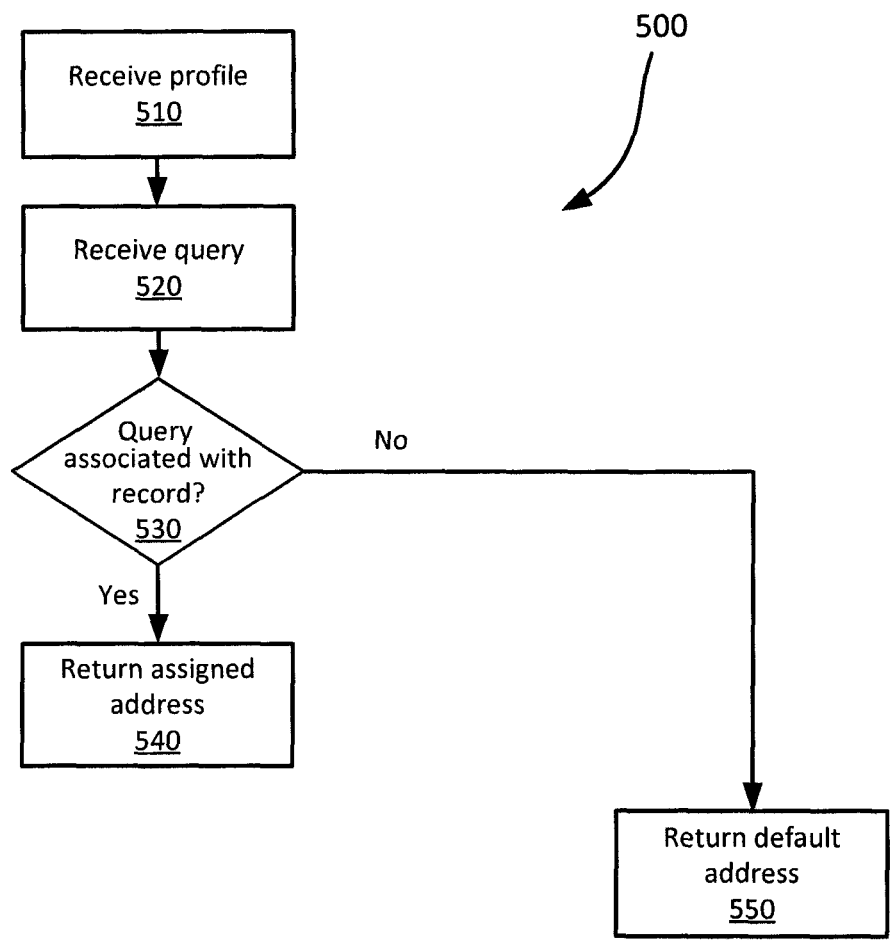
FIG. 4 is a flow chart of a method for directing network traffic in accordance with an embodiment.

Referring now to FIG. 4, a method for directing network traffic at the name server 62 is represented in the form of a flow-chart and indicated generally at 500. In order to assist in the explanation of the method 500, it will be assumed that the method 500 is performed using the system 50. Furthermore, the following discussion of the method 500 will lead to further understanding of the system 50 and its various components. However, it is to be understood that the system 50 and/or the method 500 can be varied, and need not work exactly as discussed herein in conjunction with each other, and that such variations are within the scope of the present invention. It is to be emphasized that method 500 need not be performed in the exact sequence as shown and that various blocks can be performed in parallel rather than in sequence; hence the elements of the method 500 are referred to herein as "blocks" rather than "steps".

Block 510 comprises receiving a profile record 210-1, 210-2, or 210-3. The manner by which the profile record 210-1, 210-2, or 210-3 is received is not particularly limited. In addition, the source from which the profile record 210-1, 210-2, or 210-3 is received is not particularly limited. For example, the name server 62 can receive data corresponding to datafields of a profile record via the network 70. In another embodiment, the data corresponding to datafields of a profile record can be preloaded into the name server 62, or directly loaded onto the name server 62 using a portable computer readable media, such as an optical disk. It is to be appreciated that block 510 can be repeated multiple times to populate the profile mapping database 205. Furthermore, in other embodiments where the profile mapping database 205 is pre-populated, this block can be omitted.

Table I shows a non-limiting illustrative example of the contents of the profile mapping database 205 of the system 50. The exemplary profile mapping database 205 includes three exemplary profile records 210-1, 210-2, and 210-3. In this present illustrative example, the originating computing device 54 can be named "Client 1". In addition, a second originating computing device (not shown) can be connectable to the network 70 and called "Client 2". In the present example shown in FIG. 1, the second originating computing device is not connected to the network 70. Similarly, in this present illustrative example, the destination computing device 58 can be named "server1.com" having an IP address of 123.45.67.01. In addition, a second destination computing device (not shown) can be connectable to the network 70 and called "server2.com" having an IP address of 123.45.67.02. In the present example shown in FIG. 1, the second destination computing device is not connected to the network 70. Furthermore, in this present illustrative example, the intermediation server 66a has an IP address of 321.45.67.01.

TABLE I

Example profile mapping database 205

| Profile Record | Source Identifier Datafield | Destination Identifier Datafield | Query Result |
|---|---|---|---|
| 210-1 | Client 1 | server1.com | 255.45.67.01 |
| 210-2 | Client 2 | server1.com | 255.45.67.01 |
| 210-3 | Client 3 | server2.com | 255.45.67.01 |

In Table I, Column 1, labeled "Profile Record" represents a label or other identification for each profile record. In the illustrative example shown in Table I, each profile record 210-1, 210-2, and 210-3 is identified by its reference number. It is to be appreciated that in other embodiments, the profile record 210-1, 210-2, or 210-3 can be identified using any other label such as a name or descriptor associated with the profile record.

Column 2, labeled "Source Identifier Datafield" represents an identifier of the originating computing device 54 from which the request for content originated. In the example illustrated in Table I, the source identifier datafield is populated with the name of the originating computing device 54 or any other devices for which a profile is created. However, it is to be appreciated that any identifier can be used, such as an IP address or network address associated with the originating computing device 54. In the example illustrated, the profile record 210-1 is associates with the originating computing device 54 name "Client 1". The profile records 210-2 and 210-3 are associated with a second and third originating computing devices, respectively (not shown), named "Client 2" and "Client 3" which are connectable, but not connected to the system 50 in the present illustrative example shown in FIG. 1.

Column 3, labeled "Destination Identifier Datafield" represents an identifier of the destination computing device 58 from which content is requested by the originating computing device 54. In the example illustrated in Table I, the destination identifier datafield can populated with the domain name of the destination computing device 58 and/or any other device registered on the name server 62. However, it is to be appreciated that any identifier can be used, such as a computer name or other identifier associated with the destination computing device that is typically be stored on a name server. In the example illustrated, the profile records 210-1 and 210-2 are associated with the destination computing device 58 having a domain name "server1.com". The profile record 210-3 is associated a second destination computing device (not shown) named "server2.com" which is connectable, but not connected to the system 50 in the present illustrative example shown in FIG. 1.

Column 4, labeled "Query Result" represents a numerical address of the destination computing device 58 from which content is requested by the originating computing device 54. In the example illustrated in Table I, the query result field is populated with the IP address of the destination computing device 58 and/or any other device registered on the name server 62 at which the request is directed or the IP address of the intermediation server 66. In the example illustrated, the IP address of the intermediation server is 321.45.67.01.

It is to be emphasized that the contents of Table I are for illustrative purposes, and that the profile mapping database 205 can include few or more profile records. However, the example contents of Table I will be referred to hereafter to further explanation of the present description.

Block 520 comprises receiving a query having a source identifier and a destination identifier from the originating computing device 54 via the network 70. In the present embodiment, the destination identifier is a domain name corresponding to the destination computing device 58, such as "server1.com".

Block 530 comprises using the profile mapping database 205 to determine if the query is associated with a profile record. In the present embodiment, the processor 100 is configured to analyze the query received from the originating computing device 54 to make the determination. The source identifier and the destination identifier of the query are compared with the profile records 210-1, 210-2, and 210-3 in the mapping database 205 to determine if any one of the profile records 210-1, 210-2, or 210-3 includes a matching source identifier and a matching destination identifier. The manner by which the analysis is carried out is not particularly limited and can include various search algorithms for searching the profile mapping database 205. In the present embodiment, a determination that the source identifier and the destination identifier is associated with a profile record 210-1, 210-2, or 210-3 leads to block 540. Alternatively, if a determination is made that the destination identifier is not associated with a profile record, the method leads to block 550 of the method.

In the example illustrated in Table I, if the originating computing device 54 ("Client 1") requests the query result of the destination computing device 58 ("server1.com"), the name server 62 determines that the profile record 210-1 exists and make a "yes" determination. It is to be appreciated, with the benefit of the present description, that the query result associated with each profile record 210-1, 210-2, or 210-3 can be static or dynamic. For example, the query result can be a numerical address dynamically assigned to the name server 62 by the intermediation server 66. Furthermore, each profile record 210-1, 210-2, or 210-3 can be assigned a separate numerical addresses or the same numerical address depending on various factors, such as the security requirements for each connection. In further embodiments, the numerical address can be assigned by another device such as an external namer server (not shown).

Block 540 comprises returning an assigned query result to the originating computing device 54 via the network 70. In the present embodiment, the assigned query result is obtained from the profile record associated with the destination identifier and the source identifier. The assigned query result points to the intermediation server 66 directing network traffic from the originating computing device 54 intended for the destination computing device 58 to the intermediation server 66 instead.

In the example illustrated in Table I, if the originating computing device 54 ("Client 1") requests a query result of the destination client device 58 ("server1.com"), the name server 62 returns the numerical address stored in the profile record 210-1 and direct the originating computing device to communicate with the intermediation server 66 instead of directly with the destination computing device 58.

Block 550 comprises returning a default query result to the originating computing device 54 via the network 70. In the present embodiment, the default query result is stored in the default record stored in the default mapping database 215 associated with the destination identifier. In the present embodiment, the default query result is a numerical address that points to the destination computing device 58 for directing network traffic from the originating computing device 54 to the destination computing device 58. It is to be appreciated, with the benefit of this description, that the default mapping database 215 can be a cache storing query results obtained from an external name server (not shown) as in the present embodiment. Alternatively, the default mapping database 215 can store static query results.

Table II shows a non-limiting illustrative example of the contents of the default mapping database 215 of the system 50. The exemplary default mapping database 215 includes four exemplary default records 220-1, 220-2, 220-3, and 210-4. In this present illustrative example, the destination computing device 58 can be named "server1.com" having an IP address of 123.45.67.01. In addition, a further destination computing devices (not shown) can be connectable, but not presented connected to the network 70, and called "server2.com", "server3.com", and "server4.com" having IP addresses of 123.45.67.02, 123.45.67.03, and 123.45.67.04, respectively.

TABLE II

Example default mapping database 215

| Destination Identifier Datafield | Query Result |
|---|---|
| server1.com | 123.45.67.01 |
| server2.com | 123.45.67.02 |
| server3.com | 123.45.67.03 |
| server4.com | 123.45.67.04 |

It is to be emphasized that the contents of Table II are for illustrative purposes, and that the default mapping database 215 can include few or more default records. However, the example contents of Table I will be referred to hereafter to further explanation of the present description.

Again, it is to be re-emphasized that the method 500 described above is a non-limiting representation. For example, although the method 500 is described in connection with the system 50 having a single originating computing device 54 connected to the network, it is to be appreciated that the method 500 can be applies to systems having several originating computing devices and destination computing devices as discussed below.

Figure 5:
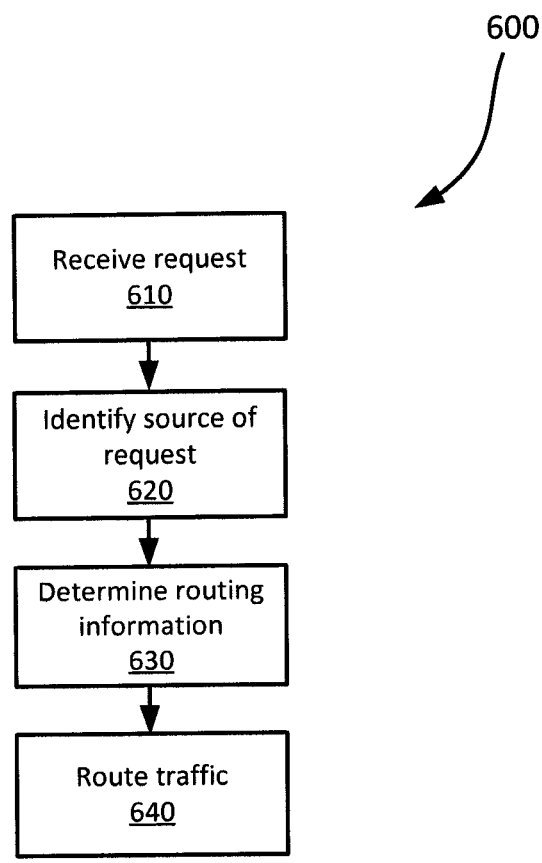
FIG. 5 is a flow chart of a method for routing network traffic in accordance with an embodiment.

Referring now to FIG. 5, a method for routing network traffic at the intermediation server 66 is represented in the form of a flow-chart and indicated generally at 600. In order to assist in the explanation of the method 600, it will be assumed that the method 600 is performed using the system 50. Furthermore, the following discussion of the method 600 will lead to further understanding of the system 50 and its various components. However, it is to be understood that the system 50 and/or the method 600 can be varied, and need not work exactly as discussed herein in conjunction with each other, and that such variations are within the scope of the present invention. It is to be emphasized that method 600 need not be performed in the exact sequence as shown and that various blocks can be performed in parallel rather than in sequence; hence the elements of the method 600 are referred to herein as "blocks" rather than "steps".

Block 610 comprises receiving a request for data intended for the destination computing device 58. In the present embodiment, the request includes a source identifier associated with the originating computing device 54.

Block 620 comprises identifying the source of the request. The manner by which the source is determined is not particularly limited. In the present embodiment, the request includes a source identifier associates with the originating computing device. Therefore, the source is determined by reference to the source identifier.

Block 630 comprises using the routing database 255 to determine how to route the network traffic from the originating computing device 54. In the present embodiment, the processor 150 is configured to analyze the request received from the originating computing device 54 to make the determination based on the routing information stored in the routing database 255.

Block 640 comprises routing the network traffic associate with the request by carrying out a routing operation in accordance with the routing information of the routing record associated with the request for data and the source of the request.

Again, it is to be re-emphasized that the method 600 described above is a non-limiting representation. For example, although the method 600 is described in connection with the system 50 having a single originating computing device 54 connected to the network, it is to be appreciated that the method 600 can be applies to systems having several originating computing devices as discussed below.

Figure 6:
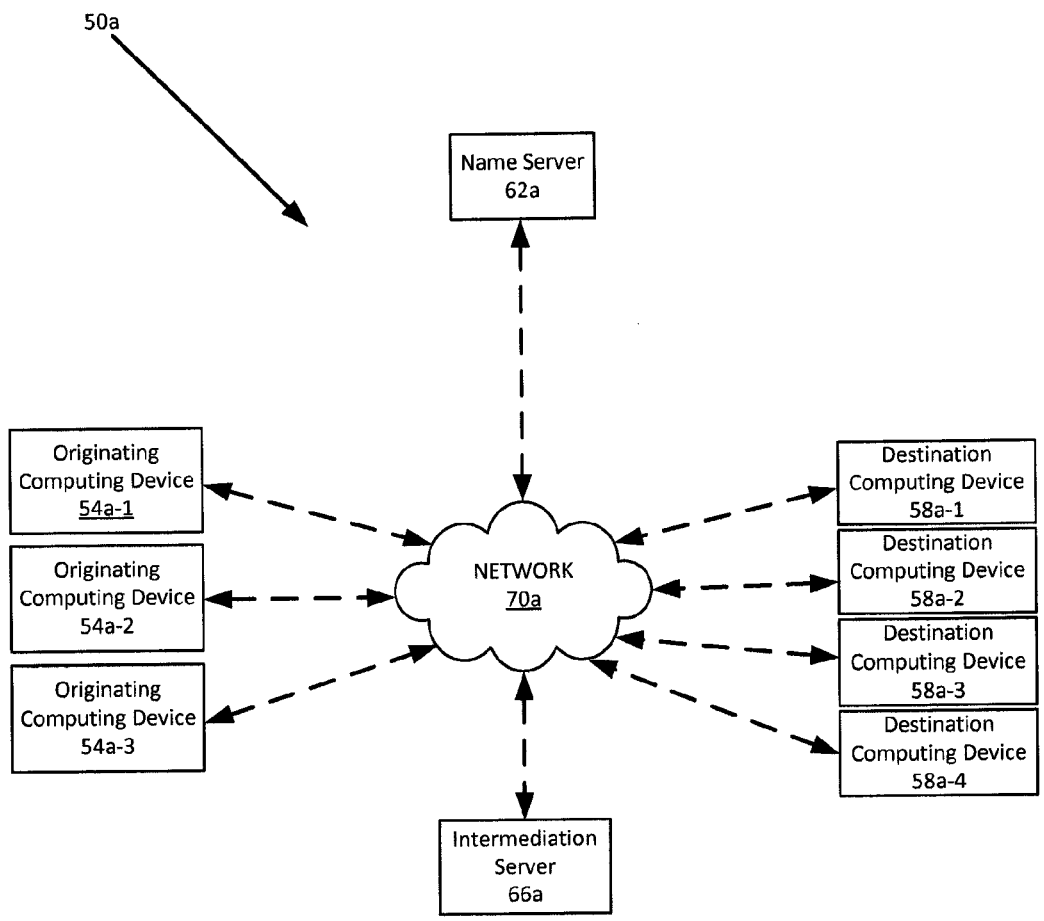
FIG. 6 is a schematic representation of a system for directing network traffic in accordance with another embodiment.

Referring now to FIG. 6, a schematic representation of another non-limiting example of a system for directing network traffic is generally shown at 50a. Like components of the system 50a bear like reference to their counterparts in the system 50, except followed by the suffix "a". The system 50a includes a plurality of originating computing devices 54a-1, 54a-2, and 54a-3, a plurality of destination computing devices 58a-1, 58a-2, 58a-3, and 58a-4, a name server 62a, and an intermediation server 66a interconnected by a network 70a.

In a general sense, each of the originating computing devices 54a-1, 54a-2, and 54a-3 can be any type of computing device configured to communicate over the network 70a for sending and receiving data including the types discussed above in connection with the originating computing device 54. Furthermore, the plurality of originating computing devices 54a-1, 54a-2, and 54a-3 are not limited to the same type of computing device and can include a combination of various types of computing devices.

Similarly, each of the destination computing devices 58a-1, 58a-2, 58a-3, and 58a-4 can be any type of computing device configured to communicate over the network 70a for sending and receiving data including the types discussed above in connection with the destination computing device 58. Furthermore, the plurality of destination computing devices 58a-1, 58a-2, 58a-3, and 58a-4 are not limited to the same type of computing device and can include a combination of various types of computing devices.

It is to be appreciated that in the system 50a, the routing information stored in the intermediation server 66a can direct the intermediation server 66a to carry out further routing operations such as re-routing traffic intended for one destination computing device 58a-1 to another destination computing device 58a-2. For example, if both of the destination computing devices 58a-1 and 58a-2 are printers, the intermediation server 66a can be used to direct traffic to the destination computing device 58a-1 and 58a-2 having the more availability. Similarly, if the destination computing devices 58a-1 and 58a-2 are mirror servers, the intermediation server 66a can be used to direct traffic to the destination computing device 58a-1 and 58a-2 having the more availability.

Figure 7:
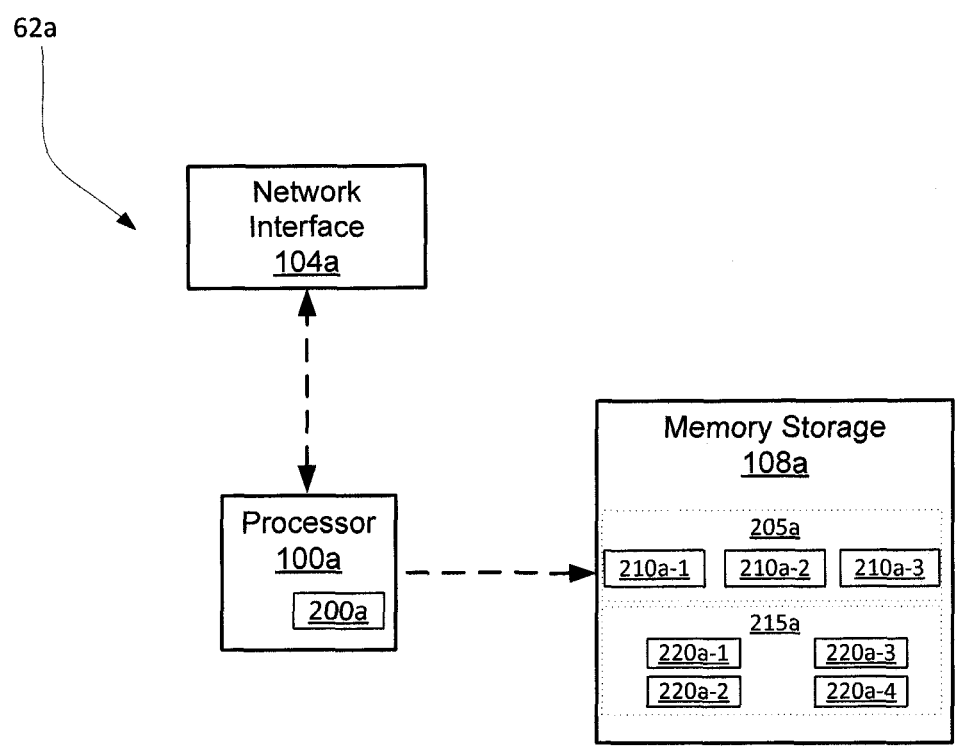
FIG. 7 is a schematic representation of a name server in accordance with the embodiment shown in FIG. 6.

Referring to FIG. 7, a schematic block diagram of the electronic components of the name server 62a is shown. Like components of the name server 62a bear like reference to their counterparts in the name server 62, except followed by the suffix "a". The name server 62a includes a processor 100a, a network interface 104a, and a memory storage unit 108a. The memory storage unit 108a is configured to store a profile mapping database 205a and a default mapping database 215a. The profile mapping database 205a includes a plurality of profile records 210a-1, 210a-2, and 210a-3. The default mapping database 215a includes a plurality of default records 220a-1, 220a-2, 220a-3 and 220a-4.

Table III shows a non-limiting illustrative example of the contents of the profile mapping database 205a of the system 50a. The exemplary profile mapping database 205a includes three exemplary profile records 210a-1, 210a-2, and 210a-3 as shown in FIG. 7. In this present illustrative example, the originating computing devices 54a-1, 54a-2, and 54a-3 can be named "Client 1", "Client 2", and "Client 3", respectively. Furthermore, in this present illustrative example, the destination computing devices 58a-1, 58a-2, 58a-3, and 58a-4 have registered domain names "server1.com", "server2.com", "server3.com" and "server4.com", respectively, and the intermediation server 66a has an IP address of 321.45.67.01.

TABLE III

Example profile mapping database 205a

| Profile Record | Source Identifier Datafield | Destination Identifier Datafield | Query Result |
| --- | --- | --- | --- |
| 210a-1 | Client 1 | server1.com | 321.45.67.01 |
| 210a-2 | Client 1 | server3.com | 321.45.67.01 |
| 210a-3 | Client 3 | server1.com | 321.45.67.01 |

Figure 8:
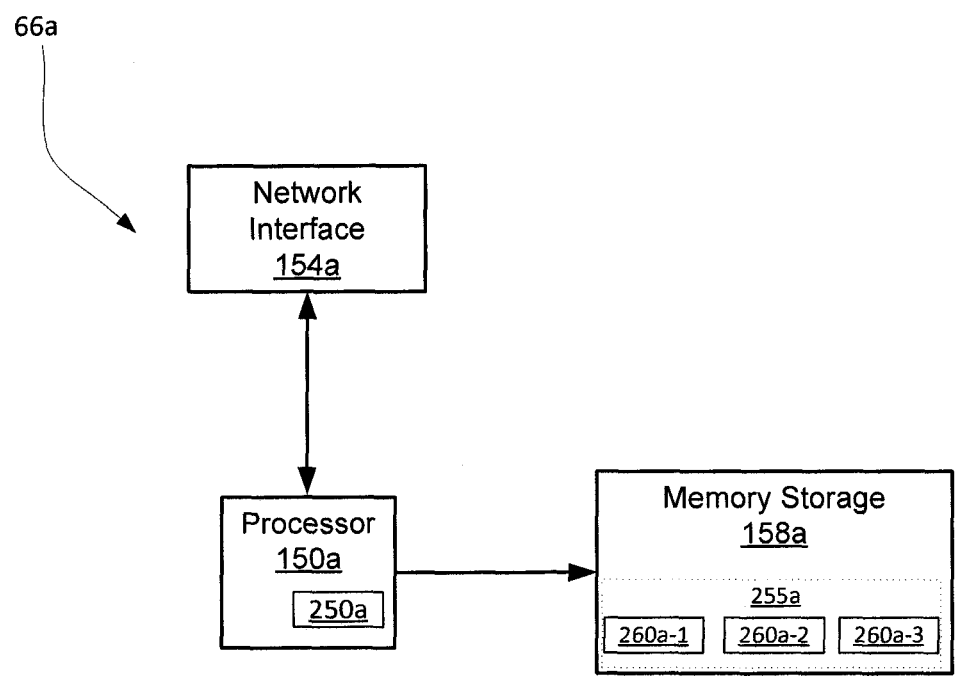
FIG. 8 is a schematic representation of an intermediation server in accordance with the embodiment shown in FIG. 6.

Referring to FIG. 8, a schematic block diagram of the electronic components of the intermediation server 66a is shown. Like components of the intermediation server 66a bear like reference to their counterparts in the intermediation server 66, except followed by the suffix "a". The intermediation server 66a includes a processor 150a, a network interface 154a, and a memory storage unit 158a. The network interface 154a and the memory storage unit 158a are each in electrical communication with the processor 150a. The memory storage unit 158a is configured to store a routing database 255a having a plurality of routing records 260a-1, 260a-2, and 260a-3. In the present embodiment, each routing record 260a-1, 260a-2, and 260a-3 includes a datafield for a source identifier associated with the originating computing device 54a and a datafield for routing information.

In general terms, the intermediation server 66a is generally configured for routing network traffic from the originating computing device 54a. However, it is to be re-emphasized that the structure shown in FIG. 8 is a schematic, non-limiting representation. For example, although the present embodiment shown in FIG. 8 includes the memory storage unit 158a for storing a routing database 255a having three routing records 260a-1, 260a-2, and 260a-3, it is to be understood that the routing database 255a can be modified to store more or less routing records. Furthermore, in the present embodiment of the system 50a, since one originating computing device 54a is provided, it is to be appreciated, with the benefit of this description, that one routing record is used.

Referring back to FIG. 4, the method 500 will be described as being performed on the system 50a in order to assist in a further explanation of the method 500 and its application to other systems. Furthermore, the following discussion of the method 500 will lead to further understanding of the system 50a and its various components. However, it is to be understood that the system 50a and/or the method 500 can be further varied, and need not work exactly as discussed herein in conjunction with each other, and that such variations are within the scope of the present invention.

Block 510 comprises receiving profile records 210a-1, 210a-2, and 210a-3. The manner by which the profile records 210a-1, 210a-2, and 210a-3 are received is not particularly limited and can include the manners discussed above in connection with the system 50. However, for exemplary purposes, it will be assumed that the values shown in Table III are received and stored in the profile mapping database 205a.

Block 520 comprises receiving a query having a source identifier and a destination identifier from one of the originating computing devices 54a-1, 54a-2, and 54a-3 via the network 70a. In the present embodiment, the destination identifier is a domain name corresponding to one of the destination computing devices 58a-1, 58a-2, 58a-3, and 58a-4, such as "server1.com", "server2.com", "server3.com", and "server4.com", respectively.

Block 530 comprises using the profile mapping database 205 to determine if the query is associated with a profile record 210a-1, 210a-2, 210a-3. The manner by which the determination is carried out is not particularly limited and can include the manners discussed above in connection with block 530 being applied to the system 50.

Block 540 comprises returning an assigned query result to the originating computing device 54a-1, 54a-2, or 54a-3 which sent the query via the network 70a. In the example illustrated in Table III, if the originating computing device 54a-1 ("Client 1") requests a query result of the destination computing device 58a-1 ("server1.com"), the name server 62a returns the numerical address stored in the profile record 210a-1 ("321.45.67.01") and direct the originating computing device 54a-1, 54a-2, or 54a-3 to communicate with the intermediation server 66a instead of directly with the destination computing device 58a-1.

Block 550 comprises returning a default query result to the originating computing device 54a-1, 54a-2, or 54a-3 which sent the query via the network 70. The manner by which this block is carried out is not particularly limited and can include the manners discussed above in connection with block 550 being applied to the system 50. The contents of the default mapping database 215a of the system 50a are the same as the values present above in Table II for the purposes of the present example.

Referring back to FIG. 5, the method 600 will be described as being performed using the system 50a in order to assist in the explanation of the method 600 and its application to other systems. Furthermore, the following discussion of the method 600 will lead to further understanding of the system 50a and its various components. However, it is to be understood that the system 50a and/or the method 600 can be further varied, and need not work exactly as discussed herein in conjunction with each other, and that such variations are within the scope of the present invention.

Block 610 comprises receiving a request for data intended for one of the destination computing devices 58a-1, 58a-2, 58a-3, or 58a-4. The manner by which the request is received is not particularly limited and can include the manners discussed above in connection with block 610 being applied to the system 50. In the present example, the request also includes a source identifier associated with the originating computing device 54a-1, 54a-2, and 54a-3.

Block 620 comprises identifying the source of the request. The manner by which the source is determined is not particularly limited and can include the manners discussed above in connection with block 610 being applied to the system 50.

Block 630 comprises using the routing database 255a to determine how to route the network traffic from the originating computing device 54a-1, 54a-2, or 54a-3. The source identifier of the request is compared with routing records 260a-1, 260a-2, and 260a-3 in the routing database 255a to determine the routing record 260a-1, 260a-2, or 260a-3 having a matching source identifier. The manner by which the analysis is carried out is not particularly limited and can include various search algorithms for searching the routing database 255a.

Table IV shows a non-limiting illustrative example of the contents of the routing database 255a of the system 50a, which will assist in the understanding of the method 600. The exemplary routing database 255a includes three exemplary routing records 260a-1, 260a-2, and 260a-3.

TABLE IV

Routing database 255a

| Routing Record | Source Identifier Datafield | Routing information |
| --- | --- | --- |
| 260a-1 | Client 1 | Block |
| 260a-2 | Client 2 | Insert notification page |
| 260a-3 | Client 3 | Anonymize and direct to 123.45.67.01 |

In Table IV, Column 1, labeled "Routing Record" represents a label or other identification for each routing record. In the illustrative example shown in Table IV, each routing record 260a-1, 260a-2, and 260a-3 is identified by its reference number. It is to be appreciated that in other embodiments, the routing record 260a-1, 260a-2, and 260a-3 can be identified using any other label such as a name or descriptor associated with the profile record.

Column 2, labeled "Source Identifier Datafield" represents an identifier of the originating computing device 54a-1, 54a-2, or 54-a-3 from which the request for content originated. In the example illustrated in Table IV, the source identifier datafield is populated with the name of the originating computing device 54a-1, 54a-2, or 54-a-3. However, it is to be appreciated that any identifier can be used, such as an IP address or network address associated with the originating computing device 54a-1, 54a-2, or 54-a-3.

Column 3, labeled "Routing Information" and represents instructions for carrying out various operations. In the example illustrated in Table IV, requests from the originating computing device 54a-1 which are directed to the intermediation server 66a are blocked. Requests from the originating computing device 54a-2 which are directed to the intermediation server 66a have a notification page returned to the originating computing device 54a-2 prior to allowing the originating computing device 54a-2 to send and receive further data. Requests from the originating computing device 54a-3 which are directed to the intermediation server 66a result in the anonymization of the originating computing device 54a-3 from the destination computing device 58a-1.

It is to be emphasized that the contents of Table IV are for illustrative purposes, and that the routing database 255a can include fewer or more profile records. However, the example contents of Table IV will be referred to hereafter to further explanation of the present description.

Figure 9:
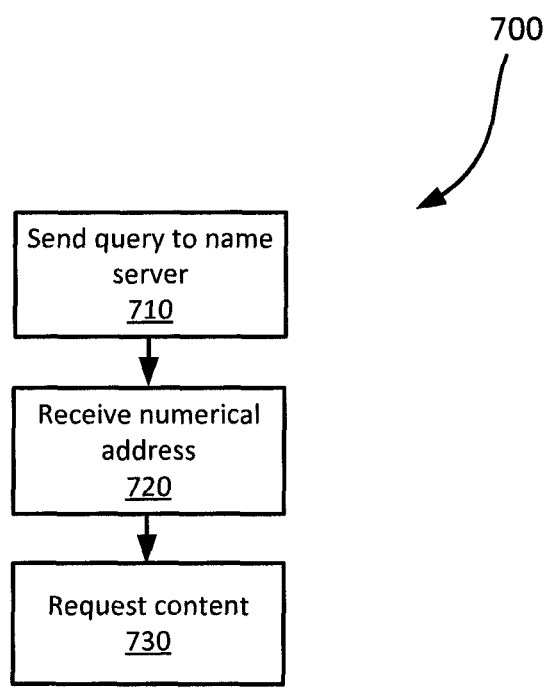
FIG. 9 is a flow chart of a method for requesting content in accordance with an embodiment.

Referring now to FIG. 9, a method for requesting content from a destination computing device 58a-1, 58a-2, 58a-3, or 58a-4 is represented in the form of a flow-chart and indicated generally at 700. In order to assist in the explanation of the method 700, it will be assumed that the method 700 is performed using the system 50a. In particular, for the purposes of the discussion below, it is to be assumed the method 700 is carried out at the originating computing device 54a. Furthermore, it will be assumed that the default mapping database 215a, profile mapping database 205a, and the routing database 255a are populated with the values shown in Table II, Table III, and Table IV. In addition, the following discussion of the method 700 will lead to further understanding of the system 50a and its various components. However, it is to be understood that the system 50a and/or the method 700 can be varied, and need not work exactly as discussed herein in conjunction with each other, and that such variations are within the scope of the present invention. It is to be emphasized that method 700 need not be performed in the exact sequence as shown and that various blocks can be performed in parallel rather than in sequence; hence the elements of the method 700 are referred to herein as "blocks" rather than "steps".

Block 710 comprises sending a query to the name server 62a. In the present exemplary embodiment, the destination identifier is the domain name of the one of the destination computing devices 58a-1, 58a-2, 58a-3, or 58a-4. For example, the destination identifier can be received via an input device such as a keyboard or touchscreen of the originating computing device 54a-1.

Block 720 comprises receiving a query result from the name server 62a. It is to be appreciated that the query result is generally obtained after execution of the method 500 at the name server. However, the originating computing device 54a is generally unaware of the processes happening on other components of the system 50a. Instead, the originating computing device 54a merely receives the query result after sending the query.

Block 730 comprises requesting content from a device located at the numerical address received by the name server 62a. For example, in the present embodiment, the originating computing device 54a-1 requests a web page from a device located at the numerical address.

Figure 10:
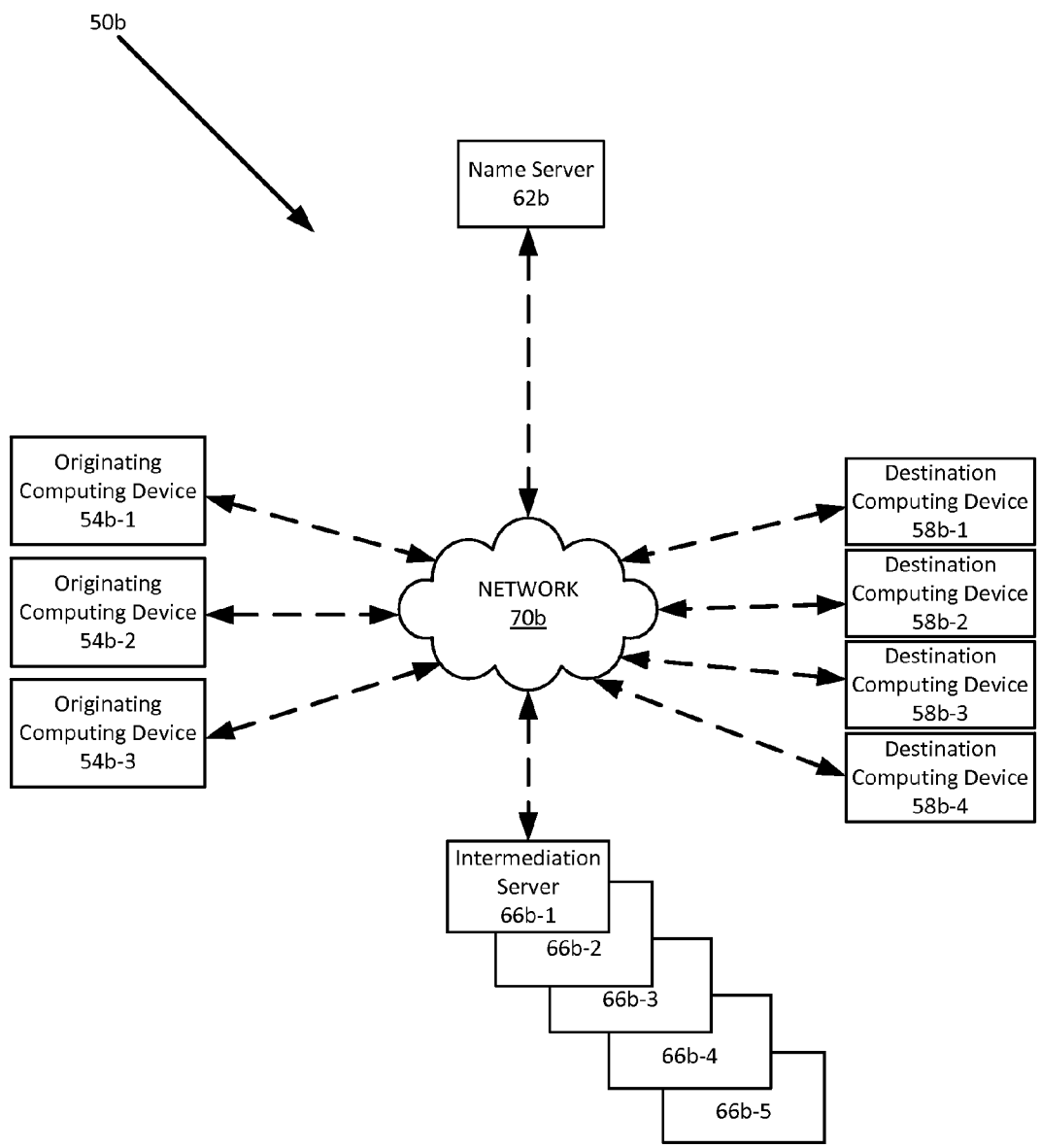
FIG. 10 is a schematic representation of a system for directing network traffic in accordance with yet another embodiment.

Referring now to FIG. 10, a schematic representation of another non-limiting example of a system for directing network traffic is generally shown at 50b. Like components of the system 50*b* bear like reference to their counterparts in the system 50*a*, except followed by the suffix "b" instead of "a". The system 50*b* includes a plurality of originating computing devices 54*b*-1, 54*b*-2, and 54*b*-3, a plurality of destination computing devices 58*b*-1, 58*b*-2, 58*b*-3, and 58*b*-4, a name server 62*b*, and a plurality of intermediation servers 66*b*-1, 66*b*-2, 66*b*-3, 66*b*-4, and 66*b*-5 interconnected by a network 70*b*.

In a general sense, each of the originating computing devices 54*b*-1, 54*b*-2, and 54*b*-3 can be any type of computing device configured to communicate over the network 70*b* for sending and receiving data including the types discussed above in connection with the originating computing device 54. Furthermore, the plurality of originating computing devices 54*b*-1, 54*b*-2, and 54*b*-3 are not limited to the same type of computing device and can include a combination of various types of computing devices.

Similarly, each of the destination computing devices 58*b*-1, 58*b*-2, 58*b*-3, and 58*b*-4 can be any type of computing device configured to communicate over the network 70*a* for sending and receiving data including the types discussed above in connection with the destination computing device 58. Furthermore, the plurality of destination computing devices 58*b*-1, 58*b*-2, 58*b*-3, and 58*b*-4 are not limited to the same type of computing device and can include a combination of various types of computing devices.

In addition, each of the intermediation servers 66*b*-1, 66*b*-2, 66*b*-3, 66*b*-4, and 66*b*-5 can be any type of server configured to communicate over the network 70*c* for sending and receiving data including the types discussed above in connection with the destination computing device 66. Furthermore, the plurality of intermediation servers 66*b*-1, 66*b*-2, 66*b*-3, 66*b*-4, and 66*b*-5 are not limited to the same type of server and can include a combination of various types of servers.

It is to be appreciated, with the benefit of this description, that each of the intermediation servers 66*b*-1, 66*b*-2, 66*b*-3, 66*b*-4, and 66*b*-5 can be configured to carry out the method 600 simultaneously. Therefore, the name server 62*b* can be configured to return an assigned query result pointing to an intermediation server 66*b*-1, 66*b*-2, 66*b*-3, 66*b*-4, or 66*b*-5. The determination of which intermediation server 66*b*-1, 66*b*-2, 66*b*-3, 66*b*-4, or 66*b*-5*b* the name server 62 portions to is not particularly limited and can be based on a result of an optimization operation carried out on the system 50*b*. For example, the name server 62*b* can be configured to determine the intermediation server 66*b*-1, 66*b*-2, 66*b*-3, 66*b*-4, or 66*b*-5 with the lowest load. Alternatively, in other embodiments, each of the intermediation servers 66*b*-1, 66*b*-2, 66*b*-3, 66*b*-4, and 66*b*-5 can be associated with one or more of the originating computing devices 54*b*-1, 54*b*-2, or 54*b*-3 such that traffic from a specific originating computing device is directed by the name server 62*b* to one or more corresponding intermediation servers. In yet another embodiment, each of the intermediation servers 66*b*-1, 66*b*-2, 66*b*-3, 66*b*-4, and 66*b*-5 can be associated with one or more of the destination computing devices 58*b*-1, 58*b*-2, 58*b*-3, and 58*b*-4, such that requests for a particular destination computing device are directed to one or more corresponding intermediation servers 66*b*-1, 66*b*-2, 66*b*-3, 66*b*-4, or 66*b*-5.

Figure 11:
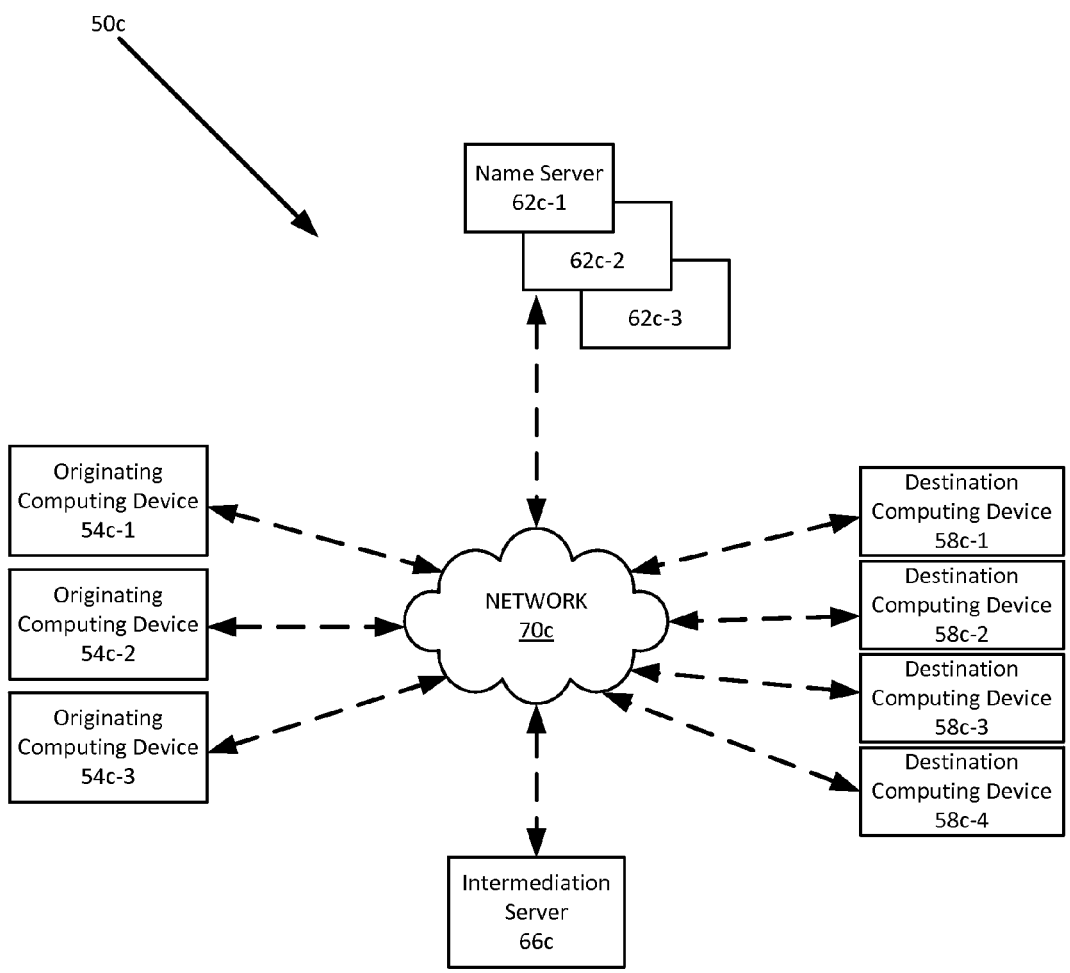
FIG. 11 is a schematic representation of a system for directing network traffic in accordance with yet another embodiment.

Referring now to FIG. 11, a schematic representation of another non-limiting example of a system for directing network traffic is generally shown at 50*c*. Like components of the system 50*c* bear like reference to their counterparts in the system 50*a*, except followed by the suffix "c" instead of "a". The system 50*c* includes a plurality of originating computing devices 54*c*-1, 54*c*-2, and 54*c*-3, a plurality of destination computing devices 58*c*-1, 58*c*-2, 58*c*-3, and 58*c*-4, a plurality of name servers 62*c*-1 62*c*-2 and 62*c*-3, and an intermediation server 66*c* interconnected by a network 70*c*.

In a general sense, each of the originating computing devices 54*c*-1, 54*c*-2, and 54*c*-3 can be any type of computing device configured to communicate over the network 70*c* for sending and receiving data including the types discussed above in connection with the originating computing device 54. Furthermore, the plurality of originating computing devices 54*c*-1, 54*c*-2, and 54*c*-3 are not limited to the same type of computing device and can include a combination of various types of computing devices.

Similarly, each of the destination computing devices 58*c*-1, 58*c*-2, 58*c*-3, and 58*c*-4 can be any type of computing device configured to communicate over the network 70*c* for sending and receiving data including the types discussed above in connection with the destination computing device 58. Furthermore, the plurality of destination computing devices 58*b*-1, 58*b*-2, 58*b*-3, and 58*b*-4 are not limited to the same type of computing device and can include a combination of various types of computing devices.

In addition, each of the intermediation servers 66*b*-1, 66*b*-2, 66*b*-3, 66*b*-4, and 66*b*-5 can be any type of server configured to communicate over the network 70*a* for sending and receiving data including the types discussed above in connection with the destination computing device 66. Furthermore, the plurality of intermediation servers 66*b*-1, 66*b*-2, 66*b*-3, 66*b*-4, and 66*b*-5 are not limited to the same type of server and can include a combination of various types of servers.

It is to be appreciated, with the benefit of this description, that each of the name servers 62*c*-1, 62*c*-2, and 62*c*-3 can be configured to carry out the method 500 simultaneously, for example, when there are multiple queries to reduce the load on each of the name servers 62*c*-1, 62*c*-2, and 62*c*-3. The determination of which name server 62*c*-1, 62*c*-2, or 62*c*-3 a query can be sent is not particularly limited and can be based on a result of an optimization operation carried out on the system 50*c*. For example, each of the originating computing devices 54*c*-1, 54*c*-2, and 54*c*-3 can be configured to determine the name server 62*c*-1, 62*c*-2, or 62*c*-3 with the lowest load. Alternatively, in other embodiments, each of the name server 62*c*-1, 62*c*-2, or 62*c*-3 can be associated with one or more of the originating computing devices 54*c*-1, 54*c*-2, or 54*c*-3 such that traffic from a specific originating computing device is directed to one or more corresponding name servers server 62*c*-1, 62*c*-2, or 62*c*-3 for processing. In yet another embodiment, each of the name server 62*c*-1, 62*c*-2, or 62*c*-3 can be associated with one or more of the destination computing devices 58*c*-1, 58*c*-2, 58*c*-3, and 58*c*-4, such that requests for a particular destination computing device are directed to one or more corresponding name server 62*c*-1, 62*c*-2, or 62*c*-3.

Therefore, it is to be appreciated, with the benefit of this description, that although the method 500 is exemplified using a single intermediation server 66, the single intermediation server 66 can be modified to include a plurality of intermediation servers, such as in FIG. 10, each with a separate IP address and separate pre-determined routing records associated with the source identifier. Similarly, although the method 600 is exemplified using a single name server 62, the single name server 62 can be modified to include a plurality of name servers, such as in FIG. 11. Therefore, the profile mapping database 205 of the name server 62 can return a unique assigned query result dependent on the destination identifier for directing the originating computing device 54 to the intermediation server associated with the destination identifier.

It is to be understood that variations of the systems 50, 50a, 50b, and 50c described above are contemplated. As a non-limiting example, features of the systems 50b and 50c can be combined such that the system includes a plurality of name servers and a plurality of intermediation servers. Furthermore, it is to be appreciated that the number of each type of devices is not limited and that more or less than the number shown in the figures can be used to form the system.

Various advantages will now be apparent. Of note is the ability to insert a transparent proxy in a network system for selectively directing network traffic for specific predetermined queries. By using a name server to return a query result directing the originating computing device to an intermediation server, the system can monitor and direct specific network traffic, such as a website request, without requiring additional computing resources to relay each message.

While specific embodiments have been described and illustrated, such embodiments should be considered illustrative and should not serve to limit the accompanying claims.

What is claimed is:

1. A name server for directing network traffic from an originating computing device to a destination computing device, the server comprising:
    a network interface configured to communicate with a network;
    a memory configured to store:
        a profile record mapping a source identifier associated with the originating computing device and a first destination identifier associated with a first destination computing device to an assigned query result comprising an intermediation server identifier identifying an intermediation server, and
        a default record mapping a second destination identifier associated with a second destination computing device to a default query result comprising an address identifying the second destination computing device; and
    a processor in communication with the memory and the network interface, the processor configured to:
        receive a message from the originating computing device, the message comprising the source identifier identifying the originating computing device and a destination identifier identifying a destination computing device;
        search for the destination identifier in the memory to determine if the destination identifier is in the profile record;
        in response to a determination that the destination identifier is in the profile record:
            determine whether the destination identifier is the first destination identifier which is associated with the first destination computing device;
            return the assigned query result comprising the intermediation server identifier to the originating computing device using the source identifier, the assigned query result comprising an instruction to cause the originating computing device to communicate with the first destination computing device through the intermediation server instead of directly with the first destination computing device; and
        in response to a determination that the destination identifier is not in the profile record:
            return the default query result to the originating computing device using the source identifier in response to a determination that the destination identifier is associated with the second destination computing device, the default query result comprising the second destination identifier causing the originating computing device to communicate directly with the second destination computing device without going through the intermediation server.

2. The name server of claim 1, wherein the processor is further configured to request the assigned query result from the intermediation server.

3. The name server of claim 1, wherein the destination identifier is a request for an intended numerical address.

4. The name server of claim 3, wherein the processor is further configured to identify the originating computing device.

5. A system comprising:
    an originating computing device connected to a network;
    a name server for directing network traffic from the originating computing device to a destination computing device, the name server comprising:
        a network interface configured to communicate with the network;
        a memory configured to store:
            a profile record, the profile record mapping a source identifier associated with the originating computing device and a first destination identifier associated with a first destination computing device to an assigned query result comprising an intermediation server identifier identifying an intermediation server, and
            a default record mapping a second destination identifier associated with a second destination computing device to a default query result comprising an address identifying the second destination computing device; and
        a processor in communication with the memory and the network interface, the processor configured to:
            receive a message from the originating computing device, the message comprising the source identifier identifying the originating computing device and a destination identifier identifying a destination computing device;
            search for the destination identifier in the memory to determine if the destination identifier in the profile record;
            in response to a determination that the destination identifier is in the profile record:
                determine whether the destination identifier is the first destination identifier which is associated with the first destination computing device;
                return the assigned query result comprising the intermediation server identifier to the originating computing device using the source identifier, the assigned query result comprising an instruction to cause the originating computing device to communicate with the first destination computing device through the intermediation server instead of directly with the first destination computing device; and
            in response to a determination that the destination identifier is not in the profile record:
                return the default query result to the originating computing device using the source identifier in response to a determination that the destination identifier is associated with the second destination computing device, the default query result comprising the second destination identifier causing the originating computing device to communicate directly with the second destination computing device without going through the intermediation server.

6. A method of directing network traffic, the method comprising:
   receiving, at a name server, a message from an originating computing device, the message comprising a source identifier associated with the originating computing device and a destination identifier associated with a destination computing device;
   searching, at the name server, for the destination identifier in the memory to determine, if the destination identifier is in a profile record, the profile record mapping the source identifier and the destination identifier to an assigned query result comprising an intermediation server identifying an intermediation server;
   in response to a determination that the destination identifier is in the profile record: returning, from the name server, the assigned query result comprising the intermediation server identifier to the originating computing device using the source identifier, the assigned query result comprising an instruction to cause the originating computing device to communicate with the destination computing device through the intermediation server instead of directly with the destination computing device; and
   in response to a determination that the destination identifier is not in the profile record: returning, from the name server, a default query result to the originating computing device using the source identifier, wherein the default query result comprises an address which identifies the destination computing device and comprises an instruction to cause the originating computing device to communicate directly with the destination computing device without going through the intermediation server.

7. The method of claim 6, wherein the name server requests the assigned query result from the intermediation server.

8. The method of claim 6, wherein the destination identifier is a request for an intended numerical address.

9. The method of claim 8, further comprising identifying, at the intermediation server, the originating computing device.

10. The method of claim 9, further comprising determining, at the intermediation server, a routing operation based on the originating computing device.

11. The method of claim 10, further comprising routing traffic in accordance with the routing operation.

12. The method of claim 11, wherein the routing operation involves blocking traffic between the originating computing device and the destination computing device.

13. The method of claim 11, wherein the routing operation involves providing, from the intermediation server to the originating computing device, a notification interrupt for inserting a notification page.

14. The method of claim 11, wherein the routing operation involves anonymizing the originating computing device.

15. A non-transitory computer readable medium comprising computer-executable instructions stored thereon that, when executed by a processor, cause the processor to:
   receive a profile record for an originating computing device, the profile record mapping a source identifier associated with the originating computing device and a destination identifier associated with the destination computing device to an assigned query result comprising an intermediation server identifier identifying an intermediation server;
   receive a message from the originating computing device, the message comprising the source identifier and the destination identifier;
   search for the destination identifier to determine if the destination identifier is in the profile record;
   return an assigned query result to the originating computing device in response to a determination that the destination identifier is in the profile record, the assigned query result comprising an instruction to cause the originating computing device to communicate with the destination computing device through the intermediation server instead of directly with the destination computing device; and
   return a default query result to the originating computing device in response to a determination that the destination identifier is not in the profile record, wherein the default query result comprises an address which identifies the destination computing device and comprises an instruction to cause the originating computing device to communicate direct with the destination computing device without going through the intermediation server.

16. The name server of claim 1, wherein the name server is configured to communicate with the network to receive the profile record.

17. The name server of claim 1, wherein the instruction in the assigned query comprises a domain name of the intermediation server.

18. The name server of claim 1, wherein the name server is further configured to operate as a domain name system (DNS) server.

19. The system of claim 5, wherein the intermediation server and the name server operate from the same computing device.

* * * * *

UNITED STATES PATENT AND TRADEMARK OFFICE
CERTIFICATE OF CORRECTION

PATENT NO. : 9,634,935 B2
APPLICATION NO. : 13/869562
DATED : April 25, 2017
INVENTOR(S) : Leonid Pechersky Page 1 of 1

It is certified that error appears in the above-identified patent and that said Letters Patent is hereby corrected as shown below:

On the Title Page

In Column 2 (item (57), Abstract) at Lines 35-36, Change "association of the between the profile record" to --association between the profile record--.

Signed and Sealed this
Twenty-first Day of November, 2017

Joseph Matal
*Performing the Functions and Duties of the
Under Secretary of Commerce for Intellectual Property and
Director of the United States Patent and Trademark Office*